United States Patent [19]
Moser

[11] 3,929,038
[45] Dec. 30, 1975

[54] GRINDING MACHINE AND DRIVE ASSEMBLY THEREFOR

[75] Inventor: Richard M. Moser, Lincoln Park, Mich.

[73] Assignee: Moni, Inc., Livonia, Mich.

[22] Filed: Jan. 2, 1975

[21] Appl. No.: 537,888

[52] U.S. Cl. .................... 74/810; 74/217 R; 74/368
[51] Int. Cl.² ..... F16H 5/52; F16H 9/00; F16H 3/14
[58] Field of Search ........ 74/810, 368, 217 R, 216.5

[56] References Cited
UNITED STATES PATENTS

| | | | |
|---|---|---|---|
| 3,087,351 | 4/1963 | Ross | 74/810 X |
| 3,501,111 | 3/1970 | Procop | 74/810 X |
| 3,757,593 | 9/1973 | Svenson | 74/810 X |

*Primary Examiner*—Leonard H. Gerin
*Attorney, Agent, or Firm*—Reising, Ethington, Barnard, Perry & Brooks

[57] ABSTRACT

A grinding machine and a drive mechanism therefor wherein the drive mechanism has high and low speed drive trains that couple an input power shaft and an output shaft driving a grinding wheel to provide either high or low speed grinding depending on the direction of power shaft rotation. The drive trains include high and low speed drive belt and sheave arrangements that drive high and low speed overrunning clutches mounted on the output shaft. The overrunning clutches are oriented to drive the output shaft in only one direction, and the low speed drive belt is trained over a pair of idler belt sheaves so as to drive the output shaft in the same direction as the high speed belt upon reversal of the direction of power shaft rotation. The low speed drive belt and the belt sheaves over which it is trained are toothed to provide a positive drive during low speed grinding when torque on the grinding wheel can be large. The idler belt sheaves are rotatably mounted by antifriction bearings on eccentric cam and shaft arrangements whose cams can be adjustably rotated to tighten the low speed belt. A reversible electric motor drives the power shaft in its opposite directions of rotation.

24 Claims, 6 Drawing Figures

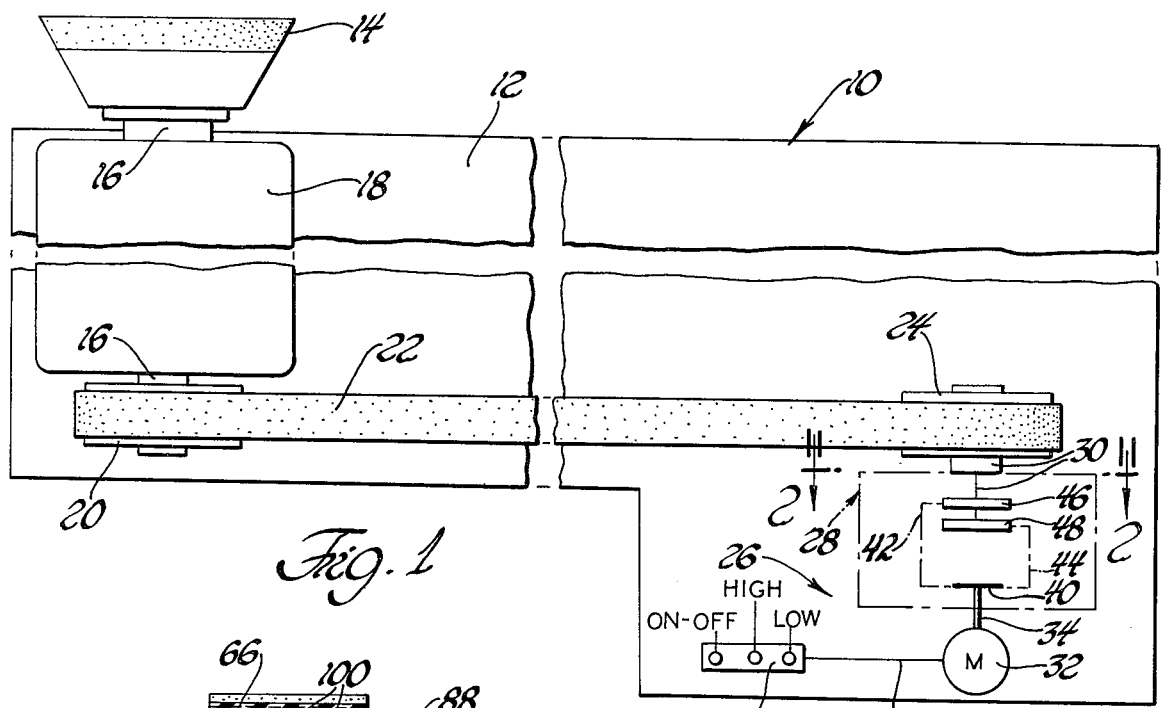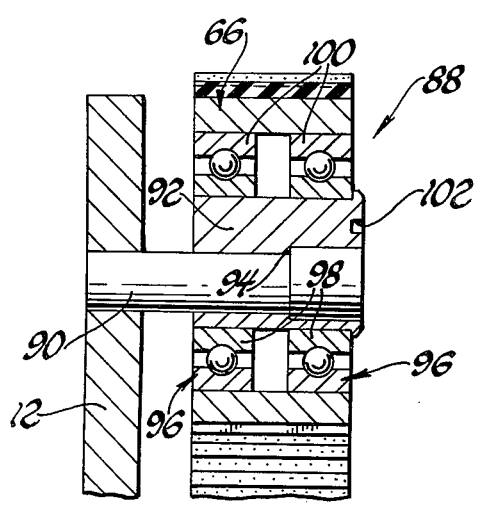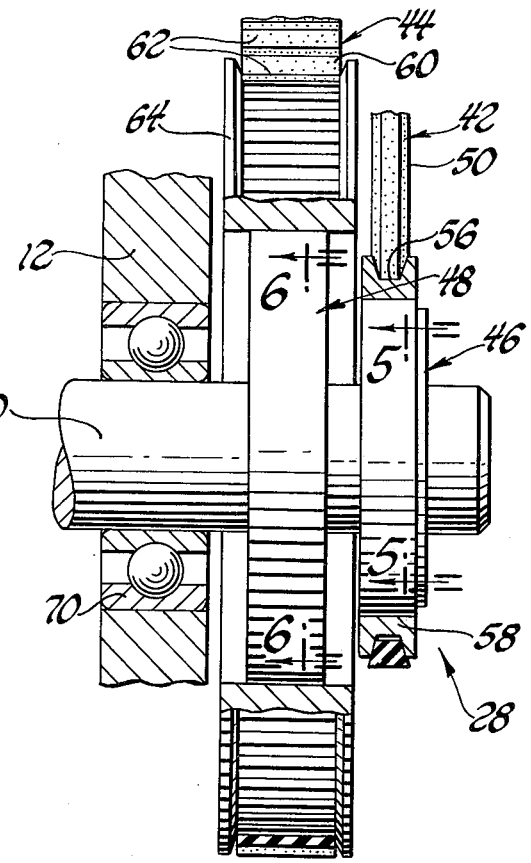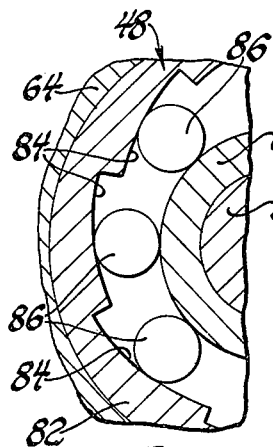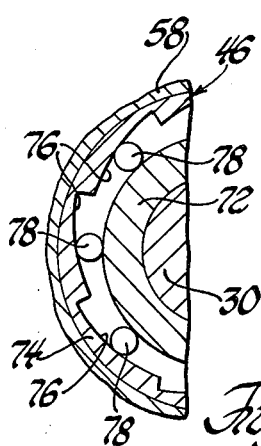

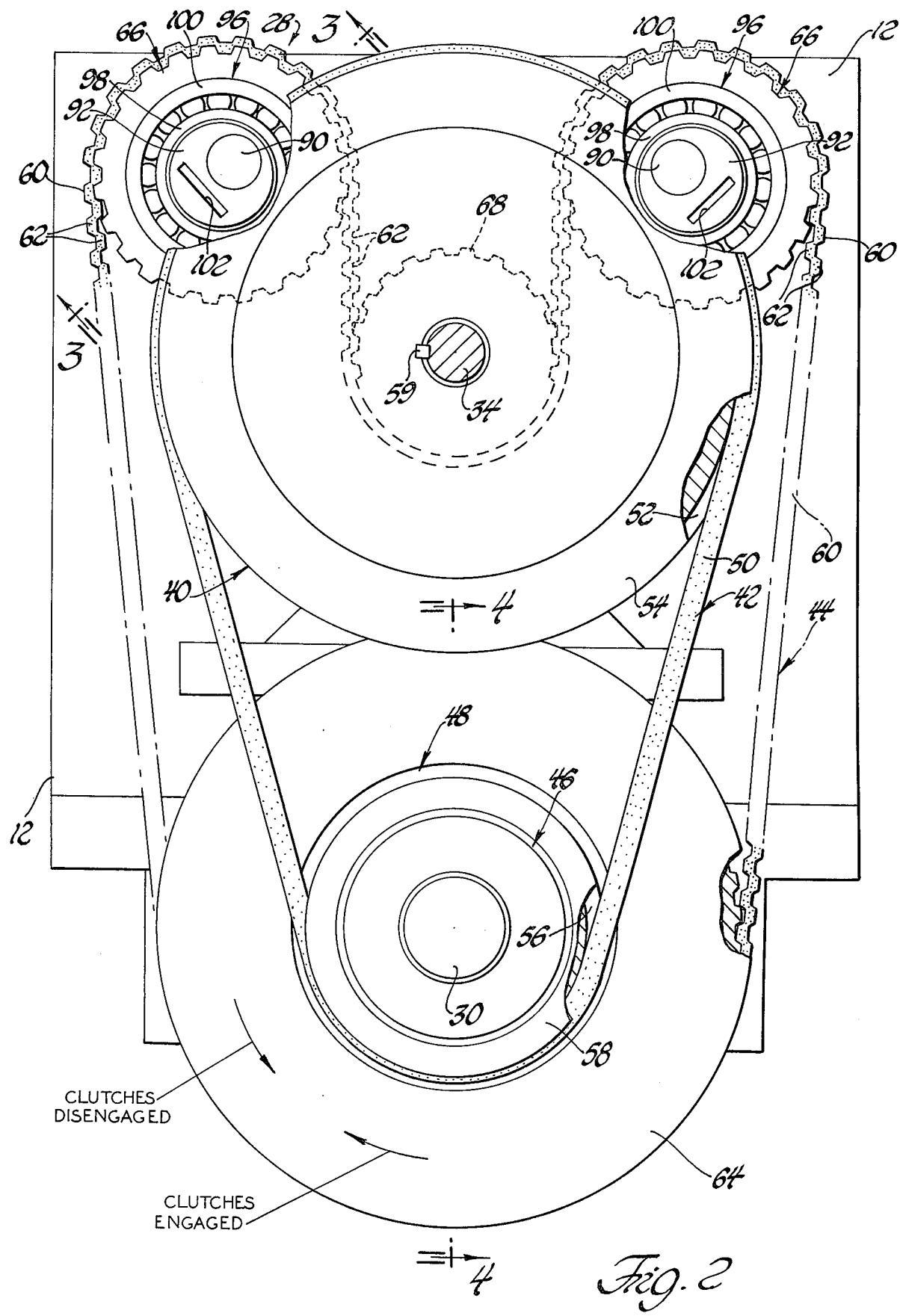

3,929,038

GRINDING MACHINE AND DRIVE ASSEMBLY THEREFOR

BACKGROUND OF THE INVENTION

This invention relates generally to grinding machines and drive mechanisms therefor which are capable of providing high and low speed grinding operations.

Grinding wheels are usually driven at relatively high or low speeds depending on the grinding operation required. Low speeds are used for rough grinding when greater material removal is desired. This is accomplished by taking relatively deep cuts of the grinding wheel through the workpiece as the workpiece is fed at a relatively fast rate. Relatively high torque is applied to the grinding wheel during the low speed grinding. On the other hand, hgh speed grinding is used to give smoother surfaces but less material is removed since the cuts taken through the workpiece are shallower and the feed rate is slower than during the low speed grinding. The torque on the grinding wheel is lower during the high speed grinding but its greater speed can cause balance problems not present at lower speeds.

It is very important to maintain constant torque on the grinding wheel and to prevent vibration that can cause premature wheel wear. Wear is caused by a loosening of abrasive particles of the wheel from a resin or bonding agent that holds the wheel together. If a constant torque is not maintained, the reversal of forces on the abrasive particles loosens and ultimately breaks their bond to the wheel to cause wear. At higher speeds, there is a greater impact of the abrasive particles into the workpiece and an increased likelihood of loosening the abrasive particles from the wheel if vibration is present.

SUMMARY OF THE INVENTION

An object of the invention is to provide a grinding machine and a drive mechanism therefor wherein high and low speed drive trains of the drive mechanism alternately connect an input power shaft with a grinding wheel for either high or low speed grinding depending on the direction of rotation of the power shaft.

The drive mechanism drives an output shaft drivingly connected to the grinding wheel and mounts high and low speed overrunning clutches of the drive trains. Both clutches are engaged to drive the output shaft in the same direction and disengaged to prevent driving of the output shaft in the other direction. A reversible electric motor drives the input power shaft. Each of the drive trains includes a high or low speed belt sheave mounted on the input power shaft, a high or low speed belt sheave that drives the output shaft through its associated overrunning clutch, and a high or low speed drive belt that is trained over its associated belt sheaves to drive the output shaft and hence the grinding wheel. The relative diameters of the belt sheaves provide the change in speed between the high and low speed grinding for opposite directions of motor operation at the same speed.

The low speed drive belt of the drive mechanism is trained over a pair of idler belt sheaves and the low speed belt sheave on the input power shaft in a serpentine configuration that drives this belt in a reverse direction to the high speed belt so that both directions of power shaft rotation drive one of the clutches in the direction that drives the output shaft and the grinding wheel. Teeth on the low speed drive belt mesh with mating teeth on the belt sheaves over which it is trained to provide a positive drive during low speed grinding when torque loads on the grinding wheel are large. The high speed drive belt extends directly between its associated belt sheaves on the power shaft and the high speed clutch to mitigate vibration during high speed grinding. Tightening of the low speed belt is possible by adjustment of eccentric cam and shaft arrangement that support the idler belt sheaves.

The drive mechanism may be adapted for use with existing grinding machines and may also be sold as a part of newly manufactured grinding machines.

BRIEF DESCRIPTION OF THE DRAWINGS

Other objects, advantages and features of the invention will become apparent from the following description of the preferred embodiment taken in connection with the accompanying drawings in which:

FIG. 1 is a partially schematic top plan view of a grinding machine and a drive mechanism therefor embodying the invention;

FIG. 2 is a view of the drive mechanism taken approximately along line 2—2 of FIG. 1;

FIG. 3 is a sectional view taken approximately along line 3—3 of FIG. 2;

FIG. 4 is a sectional view taken approximately along line 4—4 of FIG. 2; and

FIGS. 5 and 6 are sectional views taken respectively along lines 5—5 and 6—6 of FIG. 4.

DETAILED DESCRIPTION OF THE PREFERRED EMBODIMENT

With reference to FIG. 1, a grinding machine according to the present invention is generally indicated by reference numeral 10 and includes a base 12. A grinding wheel 14 of the grinding machine is rotatably carried by one end of a shaft 16 and is supported by a housing 18 on the base 12. The other end of shaft 16 carries a belt sheave 20 driven by a belt 22 which is itself driven by a belt sheave 24.

The drive assembly of grinding machine 10 is indicated generally by 26 in FIG. 1 and includes a driven mechanism designated by reference numeral 28. The drive mechanism 28 includes an output shaft 30 which drives the belt sheave 24, and hence the belt 22 and the grinding wheel 14. Drive assembly 26 also includes a reversible electric motor 32 mounted on base 12 and having a shaft 34 that provides an input shaft powering drive mechanism 28. A conduit 36 carries suitable wires connecting the motor 32 with a control panel 38. The control panel 38 includes a high speed switch that is actuated to energize the motor 32 in one direction to provide high speed grinding, a low speed switch that is actuated to energize the motor 32 in its other direction to provide low speed grinding, and and on-off switch connecting the motor with an electrical power source.

The drive mechanism 28 includes a driving member 40 fixed on the motor shaft 34. High and low speed drive trains 42 and 44 extend between the driving member 40 and the output shaft 30. A pair of overrunning clutches for the high and low speed drive trains are respectively indicated by 46 and 48. During operation of motor 32 in its high speed direction of rotation, the high speed overrunning clutch 46 is engaged and connects the driving member 40 to the output shaft 30 to thereby drive the grinding wheel 14 for high speed grinding. The low speed overrunning clutch 48 is disengaged during the high speed grinding and thus disconnects the low speed drive train between the driving member 40 and the output shaft 30. The low speed overrunning clutch 48 connects the driving member 40 and the output shaft 30 during operation of the motor in its low speed direction of rotation to provide low speed grinding. High speed clutch 46 is disengaged during low speed grinding to disconnect the motor shaft 34 from the output shaft 30 through the low speed drive train.

With reference to FIG. 2, the high speed drive train 42 includes a continuous drive belt 50 having an upper portion received by a portion of an annular groove 52 in a large diameter belt sheave 54 that is integral with the driving member 40. The low portion of high speed drive belt 50 is received by a portion of an annular groove 56 in a small diameter belt sheave 58. The small diameter belt sheave 58 of the high speed drive train is driven by belt 50 and is mounted on the high speed clutch 46 to drive the output shaft 30 in a manner that will be hereinafter described in connection with FIGS. 2 and 4. The axis of rotation of output shaft 30 is spaced below but parellel to the axis of rotation of the driving member 40, as seen in FIG. 2, and the driving member is shown as secured to the motor shaft 34 by a drive key 59.

The low speed belt drive train 44 is illustrated in FIG. 2 as including a drive belt 60 which has teeth 62 on each of its sides so as to provide toothed driving configurations. The low speed drive belt has a lower portion received by a toothed large diameter low speed belt sheave 64 of the low speed drive train. Belt sheave 64 is driven by belt 60 and is mounted on the overruning clutch 48 of the low speed drive train to the output shaft 30 in a manner that will be described later. The upper portion of the low speed drive belt 60 is trained over toothed idler belt sheaves 66 seen in FIG. 2. The idler belt sheaves are located above the motor shaft 34 on opposite sides of a line between the axes of rotation of the motor shaft and the output shaft 30.

Between the idler belt sheaves 66, the low speed drive belt 60 extends downwardly and is trained about the lower side of a toothed small diameter belt sheave 68 that is part of the driving member 40. Rotation of the motor shaft 34 thus drives the low speed drive belt with a positive drive due to their meshing toothed engagement. The idler belt sheaves 66 and the other belt sheave 64 of the low speed drive train engage the opposited toothed side of drive belt 60 as the belt sheave 68. Due to the manner in which the low speed drive belt 60 is trained over the idler belt sheaves 66 and then about the lower side of the belt sheave 68, the low and high speed drive belts 50 and 60 rotate their associated belt sheaves 58 and 64 in opposite directions about the output shaft 30 during any given direction of motor shaft rotation. Thus, as the driving member 40 rotates in either a clockwise or counterclockwise direction due to motor shaft rotation, the high and low speed drive belts 50 and 60 rotate their respective belt sheaves 58 and 64 in opposite directions about the output shaft 30.

With reference to FIG. 4, the output shaft 30 is rotatably supported on a portion of the base 12 by an antifriction bearing 70 and extends from the bearing first through the overrunning clutch 48 of the low speed drive train and then through the overrunning clutch 46 of the high speed drive train. FIG. 5 shows the cross-section of the high speed overrunning clutch 46 which includes an inner annular race 72 press fitted onto the output shaft 30 with a sufficient interference to establish a rotary driving joint. The high speed clutch 46 also includes an outer clutch member 74 of a generally annular configuration. The outer clutch member 74 is press fitted into the high speed belt sheave 58 with a sufficient interference to establish a rotary driving joint. The outer clutch member 71 defines wedge surfaces 76, and rollers or balls 78 are received between the wedge surfaces and the inner annular race 72. The wedge surfaces 76 force the rollers or balls 78 into a wedging engagement with the inner annaular race 72 of the clutch 46 whenever the high speed belt sheave 58 is driven in a clockwise direction when viewed as in FIGS. 2 or 5, to thereby provide an engaged condition of the clutch which transmits the rotational movement to the output shaft 30. Rotational movement of the high speed belt sheave 58 in a counterclockwise direction, when viewed as in FIGS. 2 and 5, causes the wedge surfaces 76 of the high speed clutch 46 to move out of their wedging engagement with the rollers or balls 78 so as to provide a disengaged condition of the clutch which allows it to freewheel and not transmit the rotary movement to the output shaft 30.

With reference to FIG. 6, the low speed overrunning clutch 48 includes an inner annular race 80 press fitted onto the output shaft 30 with a sufficient interference to establish a rotary driving joint. This low speed clutch 46 also includes an outer clutch member 82 with a generally annular configuration that encircles the inner race 80. The outer clutch member 82 is press fitted into the large diameter belt sheave 64 of the low speed drive train with a sufficient interference to establish a rotary driving joint. Wedge surfaces 84 are provided on the outer clutch member 82 and rollers or balls 86 are received between the wedge surfaces and the inner annular race 80 to provide engaged or disengaged conditions of the low speed clutch in the same manner previously described regarding the high speed clutch 46. Both clutches 46 and 48 will thus transmit clockwise rotation, when viewed as in FIGS. 2, 5 and 6, from their respective belt sheaves 58 and 64 to the output shaft 30, but freewheel as these belt sheaves are driven counterclockwise. Other embodiments of these overrunning clutches may also be used. The only stricture is that the clutch must be disengaged in one direction and transmit rotary movement in the other direction.

With reference to FIGS. 1 and 2, when the control panel 38 is actuated for high speed grinding, motor 32 rotates shaft 34 so as to rotate the driving member 40 in the FIG. 2 clockwise direction. The large diameter belt sheave 54 on the driving member 40 is then likewise rotated clockwise to drive the high speed drive belt in a direction that rotates the small diameter belt sheave 58 clockwise. The relative diameters of the large and small diameters belt sheaves 54 and 58 of the high speed drive train causes a high speed rotation of the clutch 46 in a clockwise direction so as to engage this clutch and transmit the high speed rotation to the output shaft 30. The output shaft 30 in turn through the drive belt 22 shown in FIG. 1 then rotates the grinding wheel 14 at a high speed rate of grinding. At the same time, the low speed drive belt 60 is driven in a reverse direction to the belt 50 so as to rotate the large diameter belt sheave 64 of the low speed drive mechanism in a counterclockwise direction about shaft 30. This counterclockwise direction of rotation causes the low speed clutch 48 to be disengaged so the driving member 40 is uncoupled from the output shaft 30 through the low speed drive train during the high speed grinding. Thus, the uncoupling of the low speed clutch 48 prevents the low speed drive train from acting against the driving forces of the high speed drive train during the high speed grinding.

When the control panel 38 shown in FIG. 1 is actuated to energize motor 32 and rotate the motor shaft 34 in a counterclockwise direction as viewed in FIG. 2, the small diameter belt sheave 68 on driving member 40 likewise rotates clockwise and drives low speed belt 60 in a direction so that it in turn drives the large diameter belt sheave 64 clockwise about the output shaft 30. The small diameter of the belt sheave 68 on driving member 40 as compared to the large diameter of the belt sheave 64 on the output shaft 30 causes belt sheave 64 to be rotated at a low rate. The clockwise rotation of belt sheave 64 causes the low speed clutch 48 to be engaged and transmit the low speed rotary movement to the output shaft 30 and hence to the grinding wheel 14 through the drive belt 22 shown in FIG. 1. During the low speed grinding, the high speed drive belt 50 is driven counterclockwise and rotates the high speed clutch 46 in a counterclockwise direction so it freewheels and uncouples the output shaft 30 from the driving member 40 via the high speed drive train. Thus, the high speed drive train 42 does not act against the driving forces of the low speed drive train 44 during the low speed grinding operation. Due to the relative diameters of the belt sheaves, the output shaft 30 is rotated either fast or slow for the same speed of motor shaft rotation in opposite directions.

The idler belt sheaves 66 permit the low speed drive belt 60 to be trained over the belt sheave 68 carried by the driving member 40 in an opposite direction to the manner in which the high speed belt 50 is trained over the other belt sheave 54 on driving member 40. It is this belt training which permits the rotation of the motor shaft 34 in either direction to drive the overrunning clutches 46 and 48 in opposite directions for any given direction of motor rotation. The orientation of the clutches to drive in the same direction gives the output shaft 30 its undirectional rotation during both high and low speed grinding. Having the high speed belt 50 extend directly between the high speed belt sheave 54 on the driving member 40 and the high speed belt sheave 58 on its associated overrunning clutch 46 is advnatageous in that it mitigates the possibility of vibration that can be a problem during high speed grinding. Additionally, the toothed configuration of belt sheaves 64, 66 and 68, and the complementary toothed sides on the low speed drive belt 60 is advantageous in that it provides a positive drive during low speed grinding when torque loads on the grinding wheel 14 can be large.

With reference to FIG. 3, each idler belt sheave of the low speed drive train is rotatably supported by an associated adjustable mounting arrangement 88. An elongated round shaft 90 of the mounting arrangement has one end press fitted into the base 12 so the shaft extends parallel to the motor shaft 34 and the output shaft 30. The other end of the shaft 90 has a round cam 92 press fitted onto it. The shaft 90 has a shoulder 94 that axially positions the cam 92 with respect to the shaft, and the shaft is located eccentrically with respect to the cam in FIG. 2. A pair of antifriction ball bearings 96 have their inner races 98 press fitted onto the cam 92 and their outer races 100 press fitted into the idler belt sheave 66 to provide a rotational support. The cam 92 also includes a screw driver slot 102 which receives a screw driver or a suitable tool to allow tightening of the low speed drive belt 60. The tool is inserted within the slot 102 to rotate the cam 92 about the central axis of shaft 90 so as to move the cam away from the motor shaft 34, see FIG. 2. The press fit of the shaft 90 to the cam 92 and/or to the base 12 has sufficient interference to normally prevent this rotation of the cam 92 during operation of the grinder. However, this interference is not so large as to prevent the cam rotation by use of the screw driver or tool. As the cam 92 is rotated away from the motor shaft 34, the axis of rotation of the idler belt sheave 66 moves upwardly and thereby tightens the low speed drive belt 60. The belt tightening is sufficient to overcome belt looseness that may occur due to atmospheric conditions, etc.

The drive mechanism 28 is capable of being adapted for use with existing grinding machines as well as being used in newly manufactured ones. Thus, existing grinding machines that do not presently operate in both high and low speed modes using a single grinding wheel can be equipped to do so by adaptation of the drive mechanism 28 to the grinding machine. This application will then eliminate some of the expense in providing a grinding machine which operates at both high and low speeds in the manner herein described.

While a specific form of the invention has been illustrated and described in the foregoing detailed description and accompanying drawings, it should be understood that the invention is not limited to the exact construction shown. Various alternatives in the construction and arrangement of parts will become apparent to those skilled in the art without departing from the scope and spirit of the invention.

What is claimed is:

1. A grinding machine comprising: a rotatable grinding wheel; an output shaft drivingly connected with said grinding wheel; an input power shaft; and a drive mechanically including high and low speed drive trains extending between said input power shaft and said output shaft, said high speed drive train connecting the power shaft and the output shaft during rotation of the power shaft in one direction such that the grinding wheel is griven for high speed grinding, the high speed drive train uncoupling the power shaft and the output shaft during rotation of the power shaft in the other direction, said low speed drive train uncoupling the power and output shafts during rotation of the power shaft in the one direction, and the low speed drive train coupling said power and output shafts during rotation of the power shaft in the other direction such that the grinding wheel is driven for low speed grinding.

2. A grinding machine comprising: a rotatable grinding wheel; an output shaft drivingly connected with said grinding wheel; and input power shaft; and a drive mechanism connecting the input power shaft and the output shaft, said drive mechanism including a high speed driving member and a low speed driving member fixed to said power shaft, a high speed driven member drivingly engaged with said high speed driving member, said high speed driven member being mounted on said output shaft for driving engagement therewith in response to rotation of said power shaft in one direction and for non-driving rotation with respect to said output shaft in response to rotation of said power shaft in the opposite direction, and a low speed driven member drivingly engaged with said low speed driving member, said low speed driven member being mounted on said output shaft for non-driving rotation with respect thereto in response to rotation of said power shaft in said one direction and for driving engagement with said output shaft in response to rotation of said power shaft in said opposite direction such that said grinding wheel is driven at high speed at rotation of said power shaft in said one direction and at low speed by rotation of said power shaft in said opposite direction.

3. A grinding machine according to claim 2 wherein high and low speed overrunning clutches respectively mount the high and low speed driven members on the output shaft to provide the driving engagement between said driven members and said output shaft.

4. A grinding machine according to claim 3 wherein the overrunning clutches drive the output shaft in the same direction for both directions of rotation of the input power shaft.

5. A grinding machine according to claim 3 wherein the high and low speed driving members take the form of high and low speed belt sheaves mounted on said power shaft, with the high and low speed driven members likewise taking the form of high and low speed belt sheaves mounted on the output shaft to drive said output shaft through the overrunning clutches, and with high and low speed drive belts respectively trained over the high and low speed belt sheaves to provide driving engagement between the high speed belt sheaves and between the low speed belt sheaves.

6. A grinding machine according to claim 5 wherein the relative diameters of the belt sheaves provide high and low speed rotation of the grinding wheel for the same rotational speed of the power shaft in either direction of rotation.

7. A grinding machine according to claim 5 wherein the low speed drive belt is trained over an idler belt sheave and is driven by the low speed belt sheave on the power shaft in an opposite direction to the high speed belt so that the overrunning clutches may be oriented to drive the output shaft in the same direction upon rotation of said power shaft in opposite directions.

8. A grinding machine according to claim 7 wherein the high speed drive belt extends directly between the high speed belt sheaves on the power shaft and the output shaft to mitigate vibration during high speed grinding.

9. A grinding machine according to claim 7 wherein the low speed drive belt extends over a pair of idler belt sheaves and the low speed belt sheave on the power shaft with a serpentine configuration.

10. A grinding machine according to claim 9 wherein each of said idler belt sheaves is supported by an eccentric cam shaft having a press fit that slides to permit rotatable ajustment of the cam in a manner that tightens the low speed drive belt.

11. A grinding machine comprising:
a rotatable grinding wheel;
an output shaft drivingly connected with said grinding wheel;
a reversible electric motor having a power shaft driven in opposite directions; and
a drive mechanism including high and low speed drive trains extending between the power shaft and the output shaft,
the high speed drive train including a large diameter belt sheave fixedly mounted on said power shaft, a high speed overrunning clutch mounted on the output shaft to drive said output shaft in only one direction of rotation, a small diameter belt sheave driving the high speed overrunning clutch, and a high speed drive belt trained over the large and small diameter belt sheaves of the high speed drive train to drive the output shaft at high speed in its one direction of rotation upon rotation of the power shaft in one direction so as to provide high speed grinding, the high speed overrunning clutch being disengaged upon rotation of the power shaft in its other direction to prevent the high speed drive train from driving the output shaft in the other direction of rotation of said output shaft; and
the low speed drive train including a small diameter toothed belt sheave fixedly mounted on the power shaft, a low speed overrunning clutch mounted on the output shaft and engaged to drive said output shaft in the same direction of rotation as the high speed overrunning clutch and disengaged to prevent driving thereof in the other direction of rotation, a large diameter toothed belt sheave driving the overrunning clutch of the low speed drive train, a pair of toothed idler belt sheaves rotatably supported adjacent the low speed belt sheave on the power shaft, and a two sided low speed drive belt with toothed configurations on each side thereof, the low speed drive belt being trained over the small diameter low speed belt sheave and the idler belt sheaves in a serpentine configuration as well as being trained over the large diameter low speed belt sheave driving the low speed overrunning clutch, the toothed small diameter belt sheave of the low speed drive train driving the low speed belt in an opposite direction to the high speed belt so that rotation of the power shaft in its other direction drives the output shaft in the same direction as the high speed drive train but at a slower speed is to provide low speed grinding.

12. A grinding machine according to claim 11 wherein the toothed idler belt sheaves are mounted on a base by a pair of adjustable mounting arrangements, each mounting arrangement including:
an elongated round shaft with one end press fitted into the base so the shaft projects from the base;
a round cam press fitted onto the other end of the shaft in an eccentric relationship with respect to said shaft; and
at least one anti-friction bearing mounted on the round cam and supporting the associated idler belt sheave for its rotational movement, and eccentric movement of the cam about the shaft being permitted by sliding of either press fit at the opposite ends of the shaft so as to move the axis of idler belt sheave rotation to permit tightening of the low speed drive belt.

13. A grinding machine drive mechanism for connecting a power shaft to a rotatable grinding wheel to drive said grinding wheel for either high or low speed grinding, the driven mechanism comprising: high and low speed drive trains adapted to be driven by the power shaft and an output shaft driven by the high and low speed drive trains and adapted to be drivingly connected to said grinding wheel, said high speed drive train connecting the power shaft and the output shaft during rotation of the power shaft in one direction so as to drive the grinding wheel for high speed grinding, the high speed drive train uncoupling the power shaft and the output shaft during rotation of the power shaft in the other direction, said low speed drive train uncoupling the power and output shafts during rotation of the power shaft in the one direction, and the low speed drive train coupling said power and output shafts during rotation of the power shaft in the other direction so as to drive the grinding wheel for low speed grinding.

14. A grinding machine drive mechanism for connecting a power shaft to a rotatable grinding wheel to drive said grinding wheel for either high or low speed grinding, the drive mechanism comprising: an output shaft adapted to be drivingly engaged with the grinding wheel, a high speed driving member and a low speed driving member adapted to be fixed to the power shaft, a high speed driven member drivingly engaged with said high speed driving member, said high speed driven member being mounted on said output shaft for driving engagement therewith in response to rotation of the power shaft in one direction and for non-driving rotation with respect to said output shaft in response to rotation of the power shaft in the opposite direction, and a low speed driven member drivingly engaged with said low speed driving member, and said low speed driven member being mounted on said output shaft for non-driving rotation with respect thereto in response to rotation of said power shaft in said one direction and for driving engagement with said output shaft in response to rotation of said power shaft in said opposite direction so as to drive the grinding wheel for high speed rotation upon rotation of said power shaft in said one direction and for low speed rotation upon rotation of said power shaft in said opposite direction.

15. A drive mechanism according to claim 14 wherein high and low speed overrunning clutches respectively mount the high and low speed driven members on the output shaft to provide the driving engagement between said driven members and said output shaft.

16. A drive mechanism according to claim 15 wherein the overrunning clutches drive the output shaft in the same direction for both directions of rotation of the power shaft.

17. A drive mechanism according to claim 15 wherein the high and low speed driving members adapted to be fixed to the power shaft take the form of high and low speed belt sheaves, the high and low speed driven members likewise take the form of high and low speed belt sheaves mounted on the output shaft to drive said output shaft through the overrunning clutches, and high and low speed drive belts are respectively trained over the high and low speed belts sheaves to provide driving engagement between the high speed sheaves and the low speed belt sheaves.

18. A drive mechanism according to claim 17 wherein the relative diameters of the belt sheaves provide high and low speed rotation of the output shaft for the same rotational speed of the power shaft in either direction of rotation.

19. A drive mechanism according to claim 17 wherein the low speed drive belt is trained over an idler belt sheave and is driven by the low speed belt sheave on the power shaft in an opposite direction to the high speed belt so that the overrunning clutches may be oriented to drive the output shaft in the same direction upon rotation of said power shaft in opposite direction.

20. A drive mechanism according to claim 19 wherein the high speed belt extends directly between the high speed belt sheave on the power shaft and the high speed belt sheave on the output shaft to mitigate vibration during high speed grinding.

21. A drive mechanism according to claim 19 wherein the low speed drive belt extends over a pair of idler belt sheaves with a serpentine configuration.

22. A drive mechanism according to claim 21 wherein each of the idler belt sheaves is supported by an eccentric cam and shaft having a press fit that slides to permit rotatable adjustment of the cam in a manner that tightens the low speed drive belt.

23. A grinding machine drive mechanism for connecting a power shaft to a rotatable grinding wheel to drive said grinding wheel for either high or low speed grinding, the drive mechanism comprising:

an output shaft adapted to be drivingly engaged with the grinding wheel; and high and low speed drive trains adapted to connect the power shaft and the output shaft, the high speed drive train including a large diameter belt sheave adapted to be fixedly mounted on said power shaft, a high speed overrunning clutch mounted on the output shaft to drive said output shaft in only one direction of rotation, a small diameter belt sheave driving the high speed overrunning clutch, and a high speed drive belt trained over the large and small diameter belt sheaves of the high speed drive train to drive the output shaft at high speed in its one direction of rotation upon rotation of the power shaft in one direction so as to drive the wheel for high speed grinding, the high speed overrunning clutch being disengaged upon rotation of the power shaft in its other direction to prevent the high speed drive train from driving the output shaft in the other direction of rotation of said output shaft; and the low speed drive train including a small diameter toothed belt sheave adapted to be fixedly mounted on the power shaft, a low speed overrunning clutch mounted on the output shaft and engaged to drive said output shaft in the same direction of rotation as the high speed overrunning clutch and disengaged to prevent driving thereof in the other direction of rotation, a large diameter toothed belt sheave driving the overrunning clutch of the low speed drive train, a pair of toothed idler belt sheaves rotatably supported adjacent the low speed belt sheave on the power shaft, and a two-sided low speed drive belt with toothed configurations on each side thereof, the low speed drive belt being trained over the small diameter low speed belt sheave and the idler belt sheaves in a serpentine configuration as well as being trained over the large diameter low speed belt sheave driving the low speed overrunning clutch, the toothed small diameter belt sheave of the low speed drive train driving the low speed belt in an opposite direction to the high speed belt so that rotation of the power shaft in its other direction drives the output shaft in the same direction as the high speed drive train but at a slower speed so as to drive the wheel for low speed grinding.

24. A drive mechanism according to claim 11 wherein the toothed idler belt sheaves are mounted on a base by a pair of adjustable mounting arrangements, each mounting arrangement including:

an elongated round shaft with one end press fitted into the base so the shaft projects from the base;

a round cam press fitted onto the other end of the shaft in an eccentric relationship with respect to said shaft; and at least one anti-friction bearing mounted on the round cam and supporting the associated idler belt sheave for its rotational movement, eccentric movement of the cam about the shaft being permitted by sliding of either press fit at the opposite ends of the shaft so as to move the axis of idler belt sheave rotation to permit tightening of the low speed drive belt.

* * * * *